4 Sheets—Sheet 1.

F. W. LEINBACH, C. A. WOLLE & E. H. BRUNNER.
Paper-Bag Machine.

No. 218,036. Patented July 29, 1879.

Witnesses
Henry Howson Jr.
Harry Smith

Inventors
Felix W. Leinbach
Clarence A. Wolle
and
Edward H. Brunner
by their Attorneys
Howson and Son

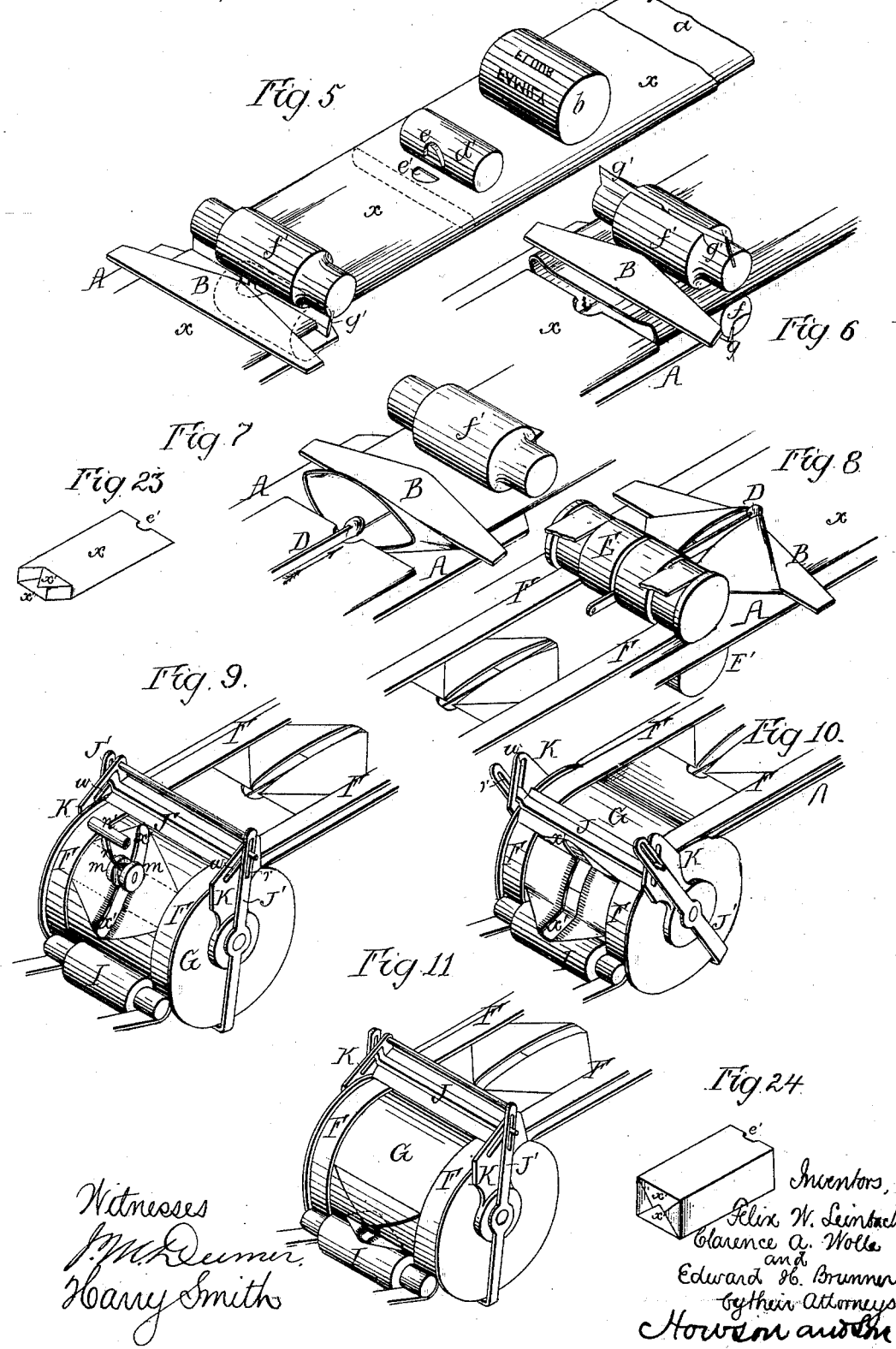

4 Sheets—Sheet 3.

F. W. LEINBACH, C. A. WOLLE & E. H. BRUNNER.
Paper-Bag Machine.

No. 218,036. Patented July 29, 1879.

Witnesses
J. M. Deemer
Harry Smith

Inventors
Felix W. Leinbach
Clarence A. Wolle
and
Edward H. Brunner
by their Attorneys
Howson and Son 4 Sheets—Sheet 4.
F. W. LEINBACH, C. A. WOLLE & E. H. BRUNNER.
Paper-Bag Machine.
No. 218,036. Patented July 29, 1879.
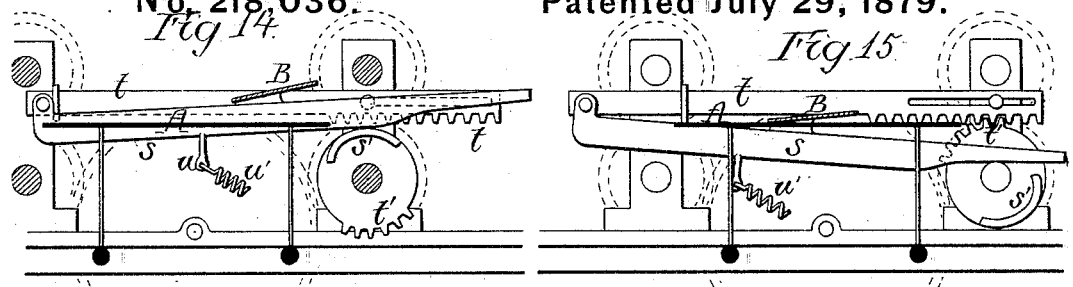
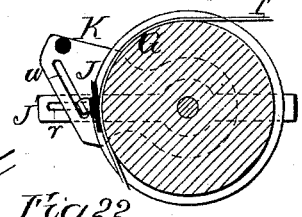
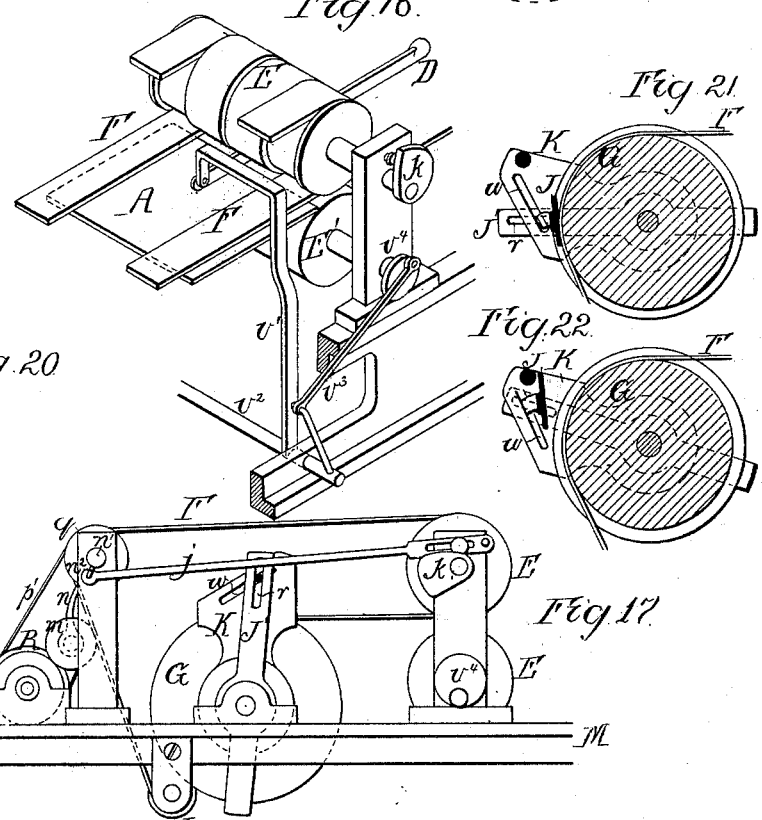
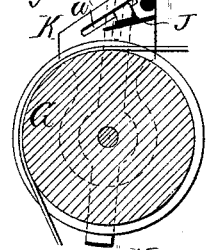
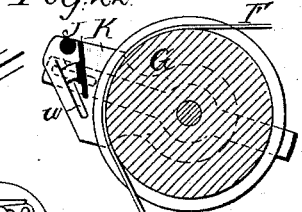
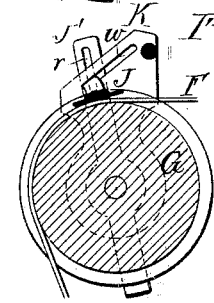
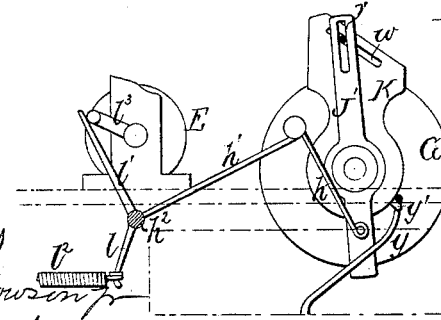
Witnesses
Henry Howson
Harry Smith
Inventors
Felix W. Leinbach
Clarence A. Wolle
and
Edward H. Brunner
by their Attorneys
Howson and Son
N. PETERS, PHOTO-LITHOGRAPHER, WASHINGTON, D. C.

UNITED STATES PATENT OFFICE.

FELIX W. LEINBACH, CLARENCE A. WOLLE, AND EDWARD H. BRUNNER, OF BETHLEHEM, PENNSYLVANIA, ASSIGNORS TO SAID WOLLE AND BRUNNER; SAID BRUNNER ASSIGNOR TO SAID WOLLE.

IMPROVEMENT IN PAPER-BAG MACHINES.

Specification forming part of Letters Patent No. 218,036, dated July 29, 1879; application filed January 15, 1879.

*To all whom it may concern:*

Be it known that we, FELIX W. LEINBACH, CLARENCE A. WOLLE, and EDWARD H. BRUNNER, all of Bethlehem, Northampton county, Pennsylvania, have invented a new and useful Improvement in Machines for Making Satchel-Bottomed Paper Bags, of which the following is a specification.

Our invention relates to certain improvements in the manufacture of satchel-bottomed bags, and in machinery for making such bags rapidly and by a continuous operation.

Figure 12:
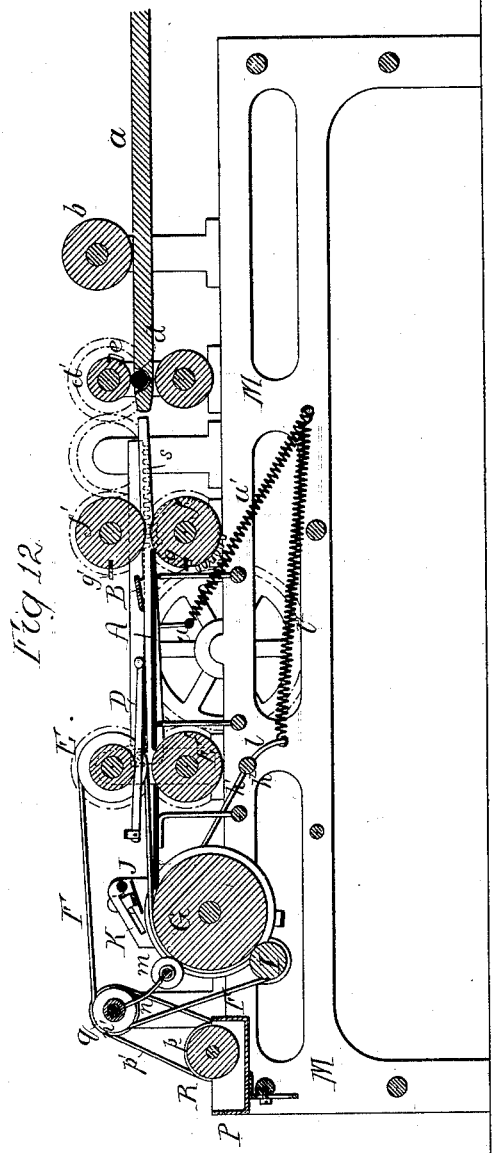
Figure 13:
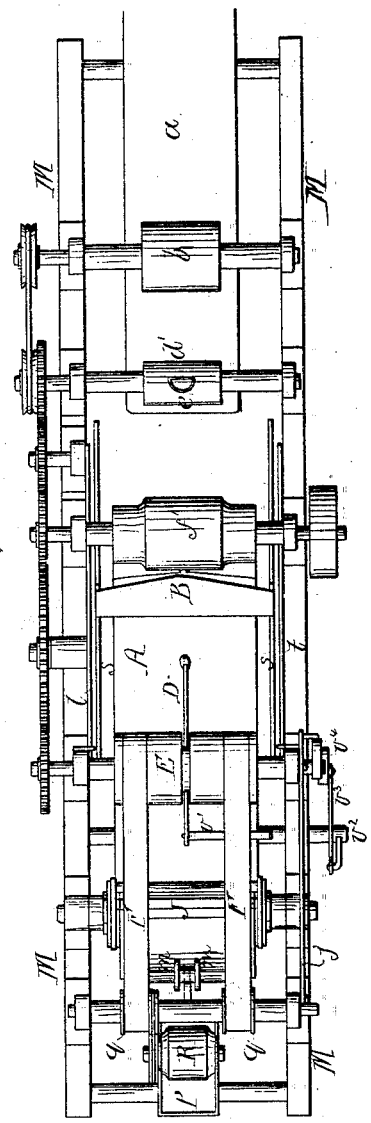

In the accompanying drawings, Figures 1 to 4, Sheet 1, are diagrams illustrating the mode of making the primary fold in the bottom of the bag. Figs. 5 to 11, Sheet 2, are diagrams illustrating detached portions of the machine and its consecutive operations; Fig. 12, Sheet 3, a vertical section of the machine; Fig. 13, a plan view of the same; Figs. 14 to 22, Sheet 4, detached views of parts of the machine; Fig. 23, Sheet 2, a view of the bag as delivered from the machine, and Fig. 24 a view of the finished bag when distended. Figs. 23 and 24 are drawn to a smaller scale than the other figures.

A preliminary understanding of the main feature of our invention can be best attained by referring to the diagrams in Sheet 1 of the drawings.

Figure 1:
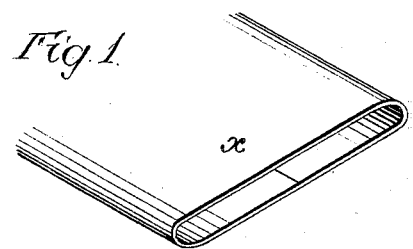
Figure 2:
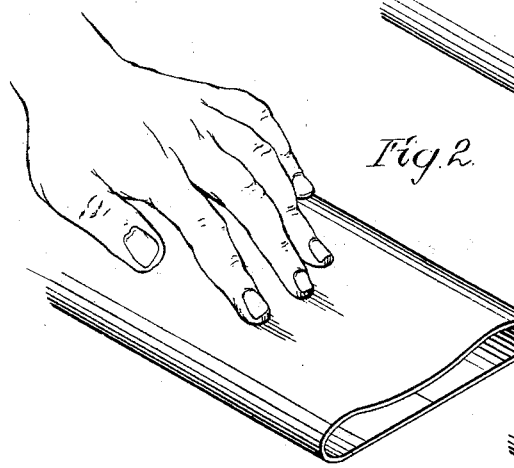
Figure 3:
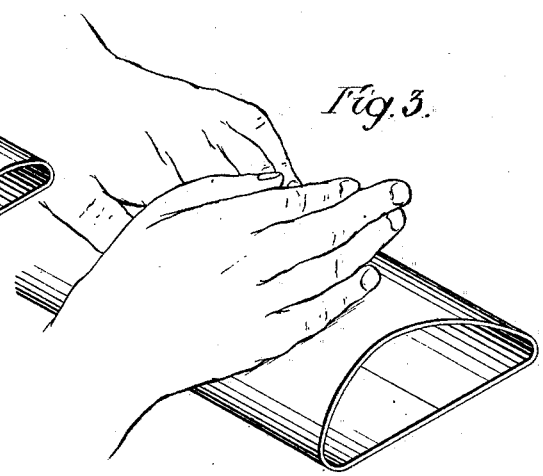
Figure 4:
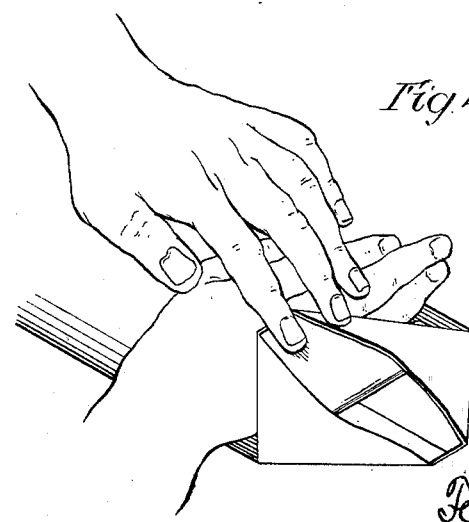

In Fig. 1, $x$ represents a tube of paper the edges of which have not been flattened, but preserve the rounded shape originally imparted to them by the tube-forming devices. If the fingers of the left hand be pressed upon this tube, as shown in Fig. 2, the central portion of the tube will be depressed, without, however, flattening the edges, so that if the right hand is then laid across the tube transversely at some distance in the rear of the mouth of the tube, as shown in Fig. 3, the said mouth will be caused to gape open, so as to permit the free entrance of the forefinger of the left hand, by which the upper edge of the mouth may be drawn back, as shown in Fig. 4, the edges of the tube being caused to turn in toward each other by this operation, so as to complete the primary fold of the bottom.

We will now proceed to describe the mode of making the bag by the operation of mechanical appliances, as shown in Sheet 2, leaving for after consideration the mechanism for actuating these appliances and combining them in an automatic machine.

The tube $x$ of paper, Fig. 5, is made in the usual manner by bending a sheet of paper over a former, $a$, and pasting together the overlapping edges of the sheet in a manner common to other paper-bag machines. The seam, however, is on the bottom instead of on the top of the tube, for a purpose which will be explained hereinafter. As the tube passes over the former it receives an impression from the type-cylinder $b$, and, after being thus printed, the upper portion of the tube passes between an elastic roller, $d$, carried by the former $a$, and a roll, $d'$, carrying a segmental knife, $e$, the latter cutting a piece from the tube, so as to leave therein an opening, $e'$, which, in every completed bag, is at the upper edge of the same, and serves as a thumb-notch to facilitate the distension of the mouth of the bag. The tube passes from the former $a$ between a pair of rollers, $f f'$, furnished with knives $g g'$, Fig. 6, which sever the tube transversely, each of the short tubes thus formed being of the proper length for conversion into a bag. The edge of the knife $g'$ is inclined, so that said knives act on the paper with a shearing effect.

The knife of the upper roll has a slot in the center, so as to leave a narrow neck, $i$, between the adjacent short tubes or bag-blanks, the necks thus formed serving to connect the blanks to each other and facilitate the even feeding of the same through the machine.

After leaving the rolls $f f'$ the blanks pass between a table, A, and a plate, B, the latter having a combined vertical and longitudinal reciprocating movement imparted to it by means of the devices hereinafter described.

It will be observed that the rolls $f f'$ are reduced in diameter at and near each end, so that only the central portion of the tube is clamped between the rollers, the edges of the tube not being flattened, but preserving the rounded shape imparted to them by the former $a$. In consequence of this the descent of the plate B onto the tubular blank, as shown in Fig. 7, causes the severed edge of the blank to gape open, so as to permit the entrance of a rod, D, which, moving in the direction of the arrow, while the blank and the plate B move in the opposite direction, causes the severed end of the blank to be folded over the plate in the manner shown in Fig. 8.

The seam, being formed on the bottom of the tube, is not subjected to strain during the above-described operation of folding the end of the blank, the distending-rod D acting on the upper portion of the tube, which is able to resist the strain. By this means the tearing apart of the freshly-pasted seam is prevented.

After the end of the blank has been folded, as above described, the blank passes between a pair of rollers, E E', by which the folded end is flattened, the blank being then fed along between the table A and a pair of belts, F, which pass round the upper roll, E, round a drum, G, and round the reduced ends of a roller, I, the body of which is in contact with the surface of the drum.

The upper roll, E, is grooved in the center for the reception of the distending-rod D.

As the blank passes round the drum G paste is applied to the folded portion of the same, as shown in Fig. 9, by means of a pair of rollers, $m$, carried by an arm, $n$, on a rock-shaft, $n^1$, the rollers, after applying the paste, being retracted, so as to be out of the way.

The passage of the folded portion of the blank round the convex face of the drum G causes the flaps $x'$ $x'$ to be tilted up, as shown in Fig. 9, so that the upper flap $x'$ is brought into the path of a plate, J, which is tangential to the periphery of the drum G, and is carried by a pair of vibrating arms, J', hung to the shaft of the drum G, and the lower flap is brought into position to be turned up by the roller I as the folded portion of the blank passes between the same and the drum G. (See Fig. 10.)

A rapid movement of partial rotation around the drum G is imparted to the plate J, so that the upper flap $x'$ is turned down previous to the turning up of the lower flap by the roller I, the end of the lower flap overlapping the end of the upper flap, so as to additionally secure the same and strengthen the bottom of the bag. (See Fig. 11.)

The plate J might be arranged parallel with instead of tangential to the surface of the drum G, although the tangential arrangement is preferred.

The size of the flaps $x'$ $x'$ is determined by the distance apart from each other of the belts F, the latter confining the blanks at the edges and serving as guides to determine the line on which the flaps $x'$ $x'$ are folded, as fully shown in Figs. 9, 10, and 11.

If desired, the roll E may have projecting strips for creasing the blanks on the transverse dotted lines shown in Fig. 9; but in most cases this will not be necessary.

After passing between the drum G and roller I the blanks are released, and fall into a suitable receptacle, or onto a belt or platform, by which they are carried to a drying-cylinder or like device.

We will now proceed to describe the construction of the machine and of the devices by which the desired movements are imparted to the parts, as described above.

M M are the opposite side frames of the machine, which are connected together and braced by suitable transverse bolts or rods, and have bearings for the journals of the printing-roller $b$, the knife-rollers $d'$ and $f\,f'$, the pressing rolls E E', the drum G, and the rock-shaft $n^1$.

The various rolls are geared together so that their surfaces travel at the proper speed for effecting the feeding of the tube of paper through the machine evenly and smoothly.

The devices for effecting the operation of the plate B are shown in Fig. 13, Sheet 3, and Figs. 14 and 15, Sheet 4. The plate is secured at each end to a bar, $s$, and one end of this bar $s$ is hung to the end of a guided bar, $t$, the latter having a rack, upon which acts at intervals a segmental pinion, $t'$, on the shaft of the lower roll, $f$.

The bars $s$ are connected together beneath the table A by a transverse rod, $u$, upon which acts a spring, $u'$, the tendency of the latter being to draw the plate B toward the rolls $f\,f'$. The bars $s$ are acted upon by cams $s'$ on the ends of the lower roll, $f$, these cams imparting a vertical vibrating movement to the bars $s$ and plate B. The longitudinal movement of the bars and plate in one direction is imparted by the segmental pinion $t'$ and rack-bar $t$, and as soon as said rack-bar is released from the control of the pinion the spring $u'$ effects the return of the bars $s$ $t$ and plate B to their original positions.

The devices for operating the distending-rod D are shown in the perspective diagram, Fig. 16.

The rod D is adapted to a groove in the roll E, and is connected to the end of a bent arm, $v^1$, on a rock-shaft, $v^2$, another arm on which shaft is connected by means of a rod, $v^3$, to a crank-pin on a wheel, $v^4$, carried by the spindle of the roll E'.

As the crank-wheel revolves the rock-shaft is vibrated, and a reciprocating movement imparted to the rod D.

Fig. 17 represents the pasting device.

In a box, P, adjacent to the drum G, is arranged a roller, R, round a pulley, $p$, on the spindle of which passes a belt, $p'$, the latter also passing round one of two pulleys, $q$, which turn loosely on the rock-shaft $n^1$, and support the belts F F.

The rock-shaft $n^1$ has an arm, $n^2$, to which is connected one end of a guided bar, $j$, the opposite end of which is acted upon by a cam, $k$, on the journal of the roll E.

As the bar $j$ is reciprocated by the cam a rocking motion is imparted to the shaft $n^1$, and the rollers $m$, carried by the arm $n$ of said shaft, are caused to vibrate between the drum G and the roller R in the paste-trough.

Figs. 18 to 22, inclusive, represent the devices for operating the plate J and the various movements of the latter. The ends of the plate J have narrow projections, which are adapted to inclined slots $w$ near the upper edges of plates K, hung to the spindle or shaft of the drum G. The ends of the projections on the plate J terminate in pins adapted to slots $r$ in the upper ends of the pivoted bars J', which, as before stated, are also hung to the shaft G.

One of the bars J' is connected by means of a rod, $h$, to the end of an arm, $h^1$, on a rock-shaft, $h^2$, the latter being adapted to bearings in the frames of the machine, and having, in addition to the arm $h^1$, two other arms, $l$ and $l^1$, the former of which is acted upon by a spring, $l^2$, the arm $l^1$ being acted upon by the bent end of an arm, $l^3$, on the spindle of the roller E'.

The action of the arm $l^3$ on the arm $l^1$ causes a rocking of the shaft $h^2$, so as to move the bars J' in one direction, and as soon as the arm $l^1$ is free from the control of the arm $l^3$ the action of the spring $l^2$ causes the retraction of the bars to their original positions, determined by the contact of a bent arm, $y$, with a pin, $y'$, on one of the plates K. When the parts are in this position, as shown in Fig. 19, the plate J is elevated some distance above the surface of the drum G; but the first effect of the forward movement of the arms J' is to cause the downward and forward movement of the plate J, owing to the inclined slots $w$ in the plates K. (See Fig. 20.) After reaching the position shown in Fig. 20, further movement of the arms J' causes the plates J to be rotated partially around the surface of the drum to the position shown in Fig. 21, the plates K being carried around by the arms J' during this movement. After reaching the position shown in Fig. 21, the direction of the movement of the arms J' is changed, the first effect of this change, owing to the inclined slots $w$ in the plates K, being to move the plate J away from the surface of the drum, as shown in Fig. 22, a continuance of the movement restoring the parts to their original positions, as shown in Fig. 19.

The above-described machine is continuous in its movement, and can be run at a very high rate of speed without risk of impairing the quality of the work. The presser-bar B and distending-rod D, moreover, act with a like degree of efficiency on all classes of paper, so that the machine may be used for the production of various grades of work, from small bags of thin paper to the largest-sized flour-sacks, which are made of paper comparatively strong and heavy.

We claim as our invention—

1. As an improvement in the manufacture of satchel-bottomed bags, the mode herein described of forming the primary fold in the bottom of the bag—that is to say, by indenting transversely a tube the edges of which have not been flattened, and then distending longitudinally the mouth of the tube, which has been partly opened by said transverse pressure, all substantially as set forth.

2. The combination of the transverse presser B, the former $a$, and center drawing-rolls $f\,f'$, arranged between the presser and the former, as set forth.

3. The combination of the transverse presser B with the longitudinally-reciprocating distending-bar D, all substantially as specified.

4. The combination of the former $a$ with the roller $d'$, having a knife, $e$, constructed as described, so as to cut a piece from the tube, leaving a thumb-notch therein, as specified.

5. The combination of the presser-plate B, the bars $s$, the rack-bars $t$, the cams $s'$, the segmental pinions $t'$, and the spring $u'$, as specified.

6. The combination of the distending-rod D with the crank-wheel $v^4$ and devices, substantially as described, whereby the motion of the crank-pin is transmitted to the rod, all as set forth.

7. The combination of the drum G with the plate J, and with devices, substantially as described, whereby the said plate is caused to approach the surface of the drum at the commencement of its movement of rotation, and to recede from said surface after reaching the limit of its rotary movement, the plate, however, always preserving its position parallel with or tangential to the periphery of the drum, as set forth.

8. The combination of the drum G, the plate J, the pivoted plates K, having inclined slots $w$, and the vibrating arms J', having slots $r$, all as described.

In testimony whereof we have signed our names to this specification in the presence of two subscribing witnesses.

FELIX W. LEINBACH.
  CLARENCE A. WOLLE.
  EDWARD H. BRUNNER.

Witnesses:
 TINSLEY JETER,
 JOHN C. WEBER.